US011657316B2

(12) United States Patent
Geguine

(10) Patent No.: US 11,657,316 B2
(45) Date of Patent: May 23, 2023

(54) SELF-FEEDING DEEP LEARNING METHOD AND SYSTEM

(71) Applicant: GENERAL ELECTRIC COMPANY, Schenectady, NY (US)

(72) Inventor: Gleb Geguine, Lachine (CA)

(73) Assignee: General Electric Company, Schenectady, NY (US)

( * ) Notice: Subject to any disclaimer, the term of this patent is extended or adjusted under 35 U.S.C. 154(b) by 1592 days.

(21) Appl. No.: 15/645,923

(22) Filed: Jul. 10, 2017

(65) Prior Publication Data

US 2019/0012610 A1    Jan. 10, 2019

(51) Int. Cl.
*G06N 20/00* (2019.01)
*H04L 67/10* (2022.01)

(52) U.S. Cl.
CPC .............. *G06N 20/00* (2019.01); *H04L 67/10* (2013.01)

(58) Field of Classification Search
CPC ........ G06N 20/00; G06N 5/025; G06N 7/005; G06K 9/6256; G06K 9/6269
USPC .......................................................... 706/12
See application file for complete search history.

(56) References Cited

U.S. PATENT DOCUMENTS

| | | | | |
|---|---|---|---|---|
| 8,543,576 B1 * | 9/2013 | Buryak | ................. | G06F 16/353 707/737 |
| 9,514,037 B1 | 12/2016 | Dow et al. | | |
| 10,614,056 B2 * | 4/2020 | Ignatyev | ................. | G06N 5/003 |
| 10,726,356 B1 * | 7/2020 | Zarandioon | ............ | G06N 7/005 |
| 2012/0191630 A1 * | 7/2012 | Breckenridge | ........ | G06N 20/00 706/12 |
| 2016/0217388 A1 * | 7/2016 | Okanohara | ............ | G06N 20/00 |
| 2016/0247033 A1 * | 8/2016 | Kotovich | ............... | G06K 9/036 |
| 2017/0366496 A1 * | 12/2017 | Habermehl | .......... | G06Q 10/101 |
| 2018/0025281 A1 * | 1/2018 | Bose | ...................... | G06N 20/00 706/12 |
| 2018/0032908 A1 * | 2/2018 | Nagaraju | ................ | G06F 11/30 |
| 2018/0374022 A1 * | 12/2018 | Wang | ...................... | G06T 7/254 |

FOREIGN PATENT DOCUMENTS

CN            103473373 A        12/2013

OTHER PUBLICATIONS

Villari, M., et al., "Osmotic Computing: A New Paradigm for Edge/Cloud Integration," IEEE Cloud Computing, vol. 3, Issue 6, pp. 76-83 (Dec. 30, 2016).
International Search Report and Written Opinion issued in connection with corresponding PCT Application No. PCT/US2018/040241 dated Sep. 19, 2018.

\* cited by examiner

*Primary Examiner* — Viker A Lamardo
(74) *Attorney, Agent, or Firm* — Armstrong Teasdale LLP

(57) ABSTRACT

Provided is a method and system for analyzing data in a run model at an edge device in a network environment. The method includes acquiring, at the edge device, data from the cloud environment, running a predetermined run model associated with the edge device and performing a first determination process by determining whether data analysis result from the run model performed is greater than an acceptance threshold. When it is determined that the data analysis result is less than the acceptance threshold, the method further performs a second determination process by determining whether the data analysis result is greater than a consideration threshold. If greater than the consideration threshold, the data is stored as acquired data to be further considered, and transferred to a cloud server.

20 Claims, 4 Drawing Sheets

US 11,657,316 B2

SELF-FEEDING DEEP LEARNING METHOD AND SYSTEM

TECHNICAL FIELD

The present invention relates generally to self-feeding deep learning method and system. In particular, the present invention relates to employing a self-feeding deep learning process to effectively detect and analyze imaging data.

BACKGROUND

In a cloud environment, an edge device typically provides an entry point to core network systems. An edge device can include a computing device such as a router, multiplexer, or an integrated access device (IAD).

As shown in a conventional method 100 in FIG. 1, an edge device typically acquires image data, for example, at operation 110. Next at operation 120, a model is run to determine if the image data is recognizable. At operation 130, the result is compared to a desired acceptance threshold and if the result is greater than a desired acceptance threshold, the process continues to operation 140 where the results are reported.

If at operation 130, the result is less than the desired acceptance threshold, the process continues to operation 150 where the results are ignored. The conventional method, however, includes several known problems for example, a large amount of data may be undetected therefore the results of the run-time process are not efficient.

SUMMARY

Given the aforementioned deficiencies, a method and system are provided capable of detecting and analyzing data (e.g., image data) by re-training edge-specific analytics and deploying an updated run model to be able to analyze as much of the data as possible, thereby increasing the efficiency of the run-time process.

Under certain circumstances, embodiments of the present invention provides a method for analyzing data in a run model at an edge device in a network environment, that includes acquiring, at the edge device, data from the cloud environment, running a predetermined run model associated with the edge device and performing a first determination process by determining whether data analysis result from the run model performed is greater than an acceptance threshold. When it is determined that the data analysis result is less than the acceptance threshold, further performing a second determination process by determining whether the data analysis result is greater than a consideration threshold, and when the data analysis result is greater than the consideration threshold, storing the data as acquired data to be further considered, and transferring, to a cloud server, the acquired data and further analyzing the data and reporting to the edge device.

Further, embodiments of the present invention the method further includes performing a third determination process to determine whether the size of the data in the data analysis result is greater than an accumulation threshold prior to further analyzing the data by modifying the data via the cloud server.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments.

Accordingly, other aspects and a more comprehensive understanding may be obtained by referring to the detailed description of the exemplary embodiments taken in conjunction with the accompanying drawings, in addition to the scope defined by the claims.

Figure 1:
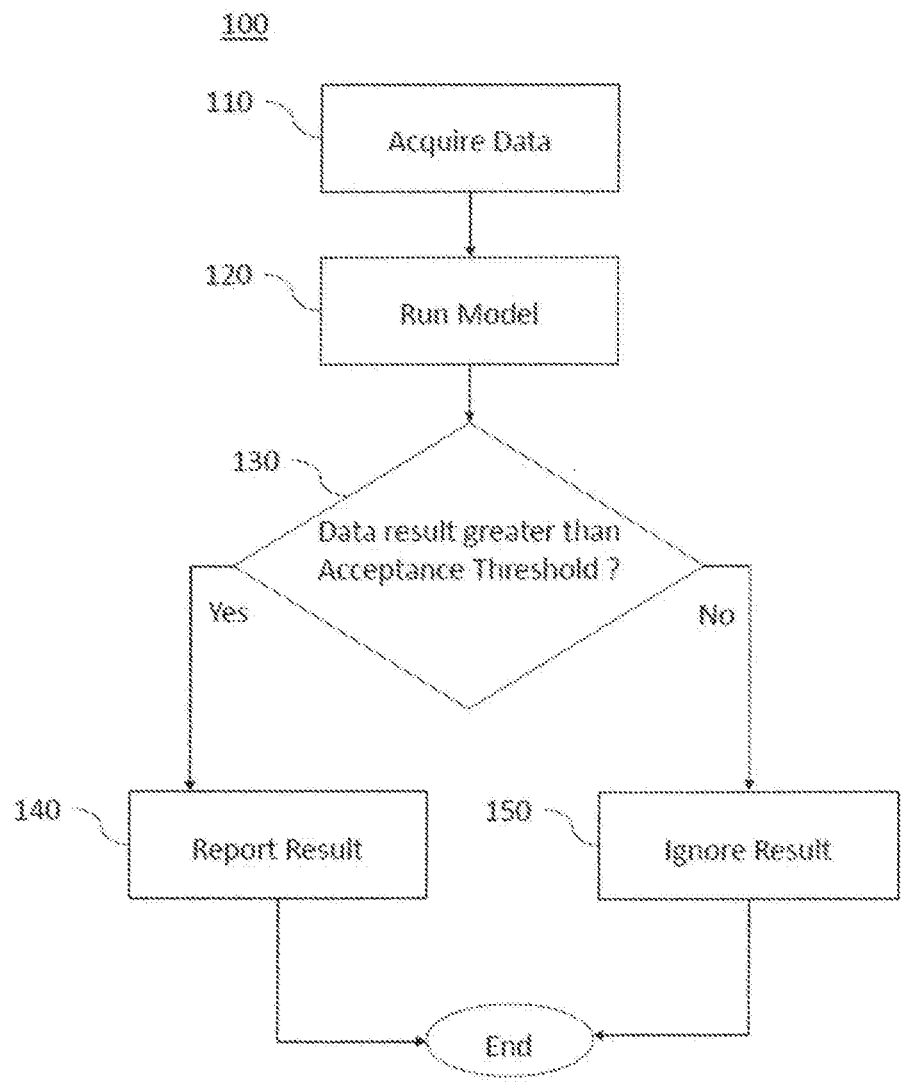
FIG. 1 is a flow diagram illustrating a conventional method of analyzing data in a run model at an edge device in a network environment.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

DETAILED DESCRIPTION

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

As noted above, the embodiments provide a method and system capable of detecting and analyzing data (e.g., image data) by retraining edge-specific analytics and deploying an updated run model to be able to analyze as much of the data as possible, thereby increasing the efficiency of the run-time process. The method can be employed within an edge device (e.g., a remote computing device, router, multiplexer, IAD, or other suitable edge device) obtaining data from a network (e.g., cloud) environment.

The edge device communicates with a cloud server (e.g., a learning server) where the remote server performs the retraining of edge-specific analytics and updating the run model and returning a modified model to the edge device to be able to efficiently analyze as much data as possible. The data can include one dimensional and two-dimensional data, such as image data, radar, lidar, ultrasound, time-captured or time-series data, single frame or temporarily-sequenced video streams. However, the present invention is not limited hereto and any suitable data can be analyzed. In all cases, embodiments of the present invention, are applicable to improve either object type recognition (face detection, vehicle detection, pedestrian detection, bicycle detection) event type recognition (e.g., accident detection, broken glass, near miss collision, etc.)

Figure 2:
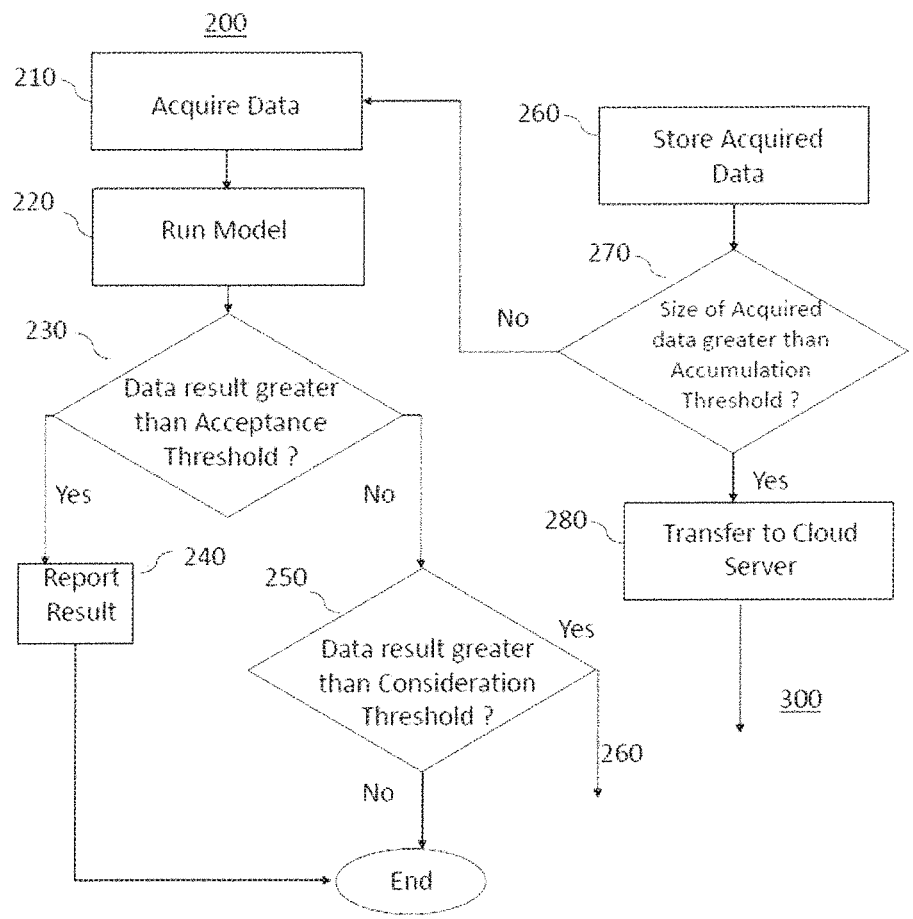
FIG. 2 is a flow diagram illustrating a method for analyzing data in a run model at an edge device in a network environment that can be implemented within one or more embodiments of the present invention.

FIG. 2 is a flow diagram illustrating a method 200 for analyzing data in a run model at an edge device in a network environment that can be implemented within one or more embodiments of the present invention. At operation 210, data is acquired from the cloud environment via an edge device. According to one or more embodiments, the data can be image data, audio data, etc. From operation 210 the process continues to operation 220 where a predetermined run model associated with the edge device and the type of data acquired is performed.

At operation 230, a first determination process performed by determining whether the data analysis result from the run model performed is greater than an acceptance threshold. According to embodiments of the present invention, the acceptance threshold can be preset based on the desired probability and/or type of data. For example, if the data is image data, the acceptance threshold can be preset to approximately 98% probability that the image can be detected.

If the data analysis result is greater than the acceptance threshold, the process continues to operation 240 where the results are reported. Alternatively, if at operation 230, it is determined that the data analysis result is less than the acceptance threshold, then the process continues to operation 250 wherein a second determination process is performed by determining whether the data analysis result is greater than a consideration threshold.

According to an embodiment of the present invention, the consideration threshold is of a range less than the acceptance threshold. For example, the consideration threshold can be preset to approximately 85% to 93% if the acceptance threshold is preset at approximately 98%. If the data analysis result is greater than the consideration threshold, then the process continues to operation 260 where the data is stored as acquired data to be further considered. It not, then the process ends.

From operation 260, the process then continues to operation 270 where a third determination process can be performed to determine whether the size of the acquired data to be further considered is greater than an accumulation threshold. According to an embodiment of the present invention, the accumulation threshold defines the size of accumulatated data to trigger a re-learning cycle. That is, the accumulation threshold is related to the number of cases in the consideration threshold. Accumulation threshold is set in accordance of the initial training data set used in the model and can be set in the range of approximately 1%-5% of the data set.

If it is determined at operation 270 that the amount of the acquired data to be considered is greater than the accumulation threshold, then the process continues to operation 280 where the acquired data is transferred to a learning server for process as discussed below with reference to FIG. 3. If not, then the process returns to operation 210. Alternatively, the method 200 may be varied such that after operation 260, the process continues directly to operation 280 whereby samples in the consideration buffer are transferred, and the accumulation threshold is calculated for the annotated data on the server taking into account the success of the annotation process.

Figure 3:
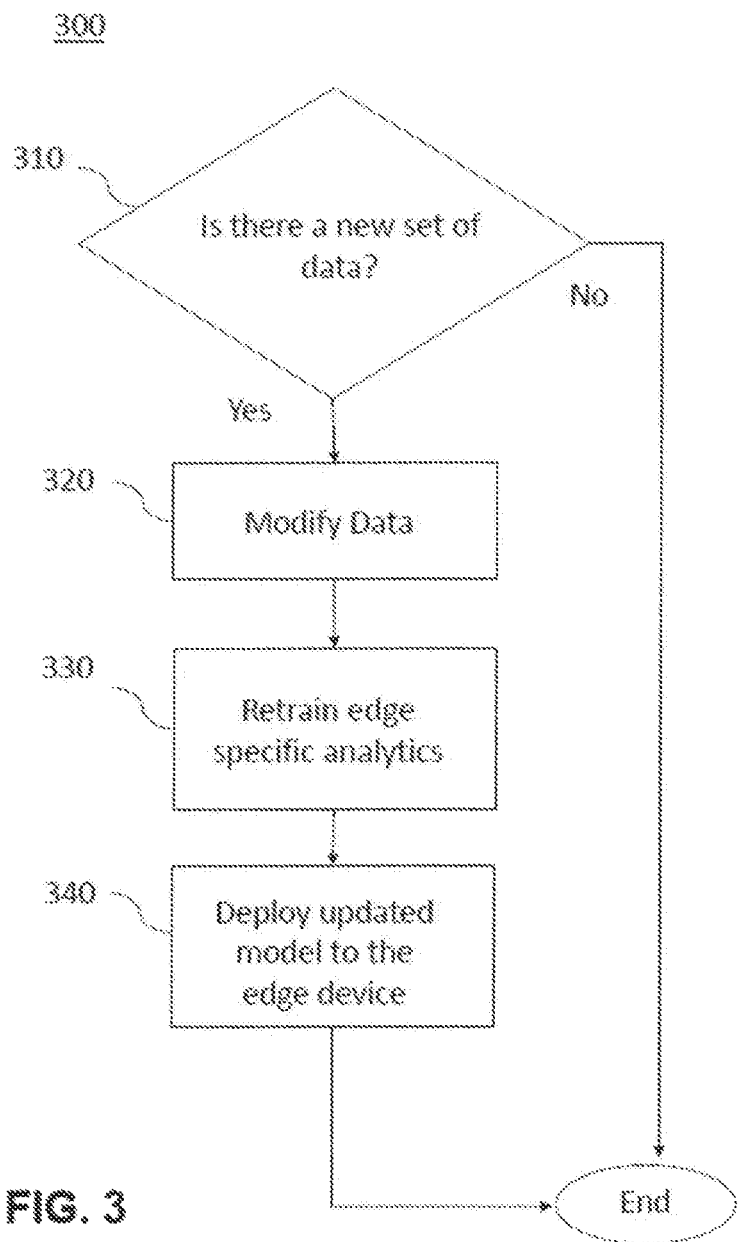
FIG. 3 is a flow diagram illustrating a method performing communication between an edge device and a learning server via a cloud environment that can be implemented within one or more embodiments of the present invention.

FIG. 3 is a flow diagram illustrating a method 300 performing communication between an edge device and a learning server via a cloud environment that can be implemented within one or more embodiments of the present invention. In method 300, at operation 310 it is determined whether the acquired data to be considered is a "new" set of data.

If the data is a new set, from operation 310 the process continues to operation 320, where the new data is modified (e.g., annotated). According to one or more embodiments, the modification can be performed using more aggressive server analytics and/or user input. According to an embodiment, the annotation or labeling is a process that identifies the correct interpretation of the data set being analyzed. The annotation can be performed by a user or the system.

From operation 320, the process continues to operation 330 where the system-specific analytics model of the edge device is adjusted by retraining using the annotated additional data along with the previous training data set, and the process continues to operation 340 where the adjusted model is transmitted to the edge device.

Figure 4:
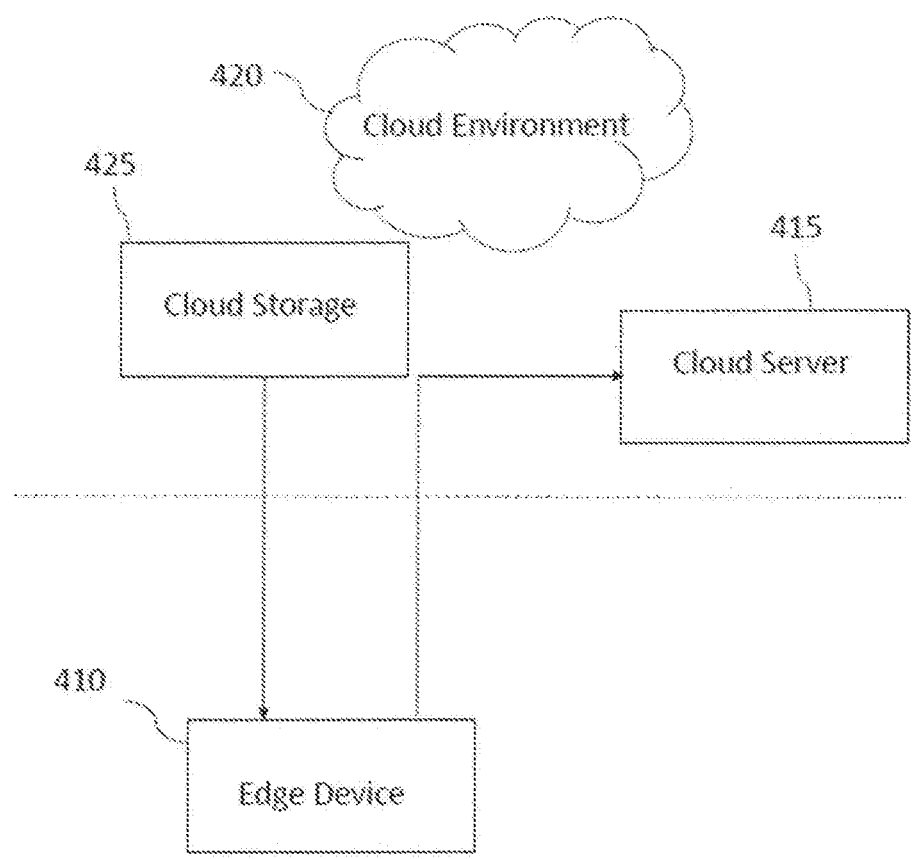
FIG. 4 is a block diagram illustrating a system implementing the methods performed in FIGS. 2 and 3 that can be implemented within one or more embodiments of the present invention.

The methods performed in FIGS. 2 and 3 can be implemented in a system 400 as shown in FIG. 4, within one or more embodiments of the present invention. The system 400 includes at least one edge device 410 (e.g., a field device) and a cloud (e.g., a learning) server 415 communicating with each other over a cloud network 420, and a cloud storage 425. The edge device 410 retrieves data from the cloud network 420. A predetermined run model associated with the edge device 410 and the type of data acquired is performed at the edge device 410.

The edge device 410 determines whether the data analysis result from the run model performed is greater than an acceptance threshold. If so, the results are reported. Alternatively, if not then the edge device 410 determines whether the data analysis result is greater than a consideration threshold. If the data analysis result is greater than the consideration threshold, then the data is stored as "acquired data" to be further considered. It not, the process ends.

The data can be stored in a storage at the edge device 410, a separate storage in communication with the edge device 410 or within the cloud storage 425 of the cloud network 420. The acquired data is then transferred to, or retrieved by the cloud (e.g., learning) server 415 from the cloud storage 425.

As discussed above, a third determination process can be performed by the edge device 410 before transferring or retrieving the acquired data, in which it can be determined whether the size of the acquired data is greater than an accumulation threshold. If so, then the acquired data is transferred to a learning server 420 for further analysis process.

The learning server 420 determines whether the acquired data to be considered is a "new" set of data. If so, new data is modified using more aggressive server analytics and/or user input. The system-specific analytics model of the edge device 410 is adjusted by re-training using the modified data, and the adjusted model is transmitted to the edge device 410. According to an embodiment, the learning server 420 maintains a database of the training set for all associated edge devices 410. During the re-training the new additional annotated data is added to the existing training set and the modified training dataset is used for re-training and stored in the database to serve as the base for future re-training iterations.

Embodiments of the present invention provide methods and a system employing a self-feeding deep learning process to effectively detect and analyze as much data as possible via a computing devices (e.g., an edge device) and improve the run-time process.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for analyzing data in a run model at an edge device in a network environment, the method comprising:
   acquiring, at the edge device, data from the network environment;
   running, at the edge device, a run model associated with the edge device;
   performing, at the edge device, a first determination process by determining whether a data analysis result from the run model performed is greater than an acceptance threshold;
   when it is determined that the data analysis result is less than the acceptance threshold, performing, at the edge device, a second determination process by determining whether the data analysis result is greater than a consideration threshold;
   when the data analysis result is greater than the consideration threshold, storing, at a cloud storage device, the data as acquired data to be further considered;
   transferring, to a cloud server, the acquired data and further analyzing the data and reporting to the edge device;
   determining, by the cloud server, whether the acquired data is a new set of data; and
   adjusting, by the cloud server, the run model associated with the edge device based on the acquired data, wherein adjusting the run model associated with the edge device comprises:
   modifying, by the cloud server, the acquired data by annotating the acquired data; and
   adjusting, by the cloud server, the run model associated with the edge device by retraining using the modified acquired data and transmitting the adjusted model to the edge device.

2. The computer-implemented method of claim 1, further comprising:
   performing a third determination process prior to transferring the acquired data to the cloud server, to determine whether a size of the acquired data to be further considered is greater than an accumulation threshold.

3. The computer-implemented method of claim 2, wherein the accumulation threshold is related to a total number of cases in the consideration threshold.

4. The computer-implemented method of claim 1, further comprising performing a third determination process after transferring the acquired data to the cloud server, to determine whether a size of the acquired data to be further considered is greater than an accumulation threshold, wherein the accumulation threshold is related to a total number of cases in the consideration threshold.

5. The computer-implemented method of claim 1, wherein the data includes one-dimensional data and two-dimensional data.

6. The computer-implemented method of claim 5, wherein the one-dimensional data and the two-dimensional data comprises one of image data, radar data, ultrasound, time-captured, time-series data, a single frame or a temporarily-sequenced video stream.

7. The computer-implemented method of claim 1, wherein the acceptance threshold is preset based on desired probability and/or type of data acquired.

8. The computer-implemented method of claim 1, wherein the consideration threshold is of a range less than the acceptance threshold.

9. The computer-implemented method of claim 2, wherein the accumulation threshold is less than the consideration threshold.

10. The computer-implemented method of claim 1, wherein the run model is based on a type of data acquired.

11. The computer-implemented method of claim 1, further comprising:
    modifying the data via user input.

12. The computer-implemented method of claim 1, wherein annotating the acquired data comprises labeling, by the cloud server, the acquired data using at least one of server analytics and user input.

13. A system comprising:
    at least one edge device and a cloud server communicating with each other over a cloud network,
    the edge device configured to:
      (i) retrieve data from the cloud network;
      (ii) run a run model associated with the edge device;
      (iii) determine whether a data analysis result from the run model performed is greater than an acceptance threshold; and
      (iv) if greater, store, at a cloud storage device, data as acquired data to be further considered via the cloud server;
    the cloud server configured to:
      (i) determine whether the acquired data is a new set of data;
      (ii) adjust the run model associated with the edge device based on the acquired data;
      (iii) modify the acquired data by annotating the acquired data;
      (iv) adjust the run model associated with the edge device by retraining using the modified data; and
      (v) transmit the adjusted model to the edge device.

14. The system of claim 13, wherein the edge device is further configured to determine whether a size of the acquired data is greater than an accumulation threshold, and if greater, then transferring the acquired data to the cloud server for further analysis.

15. The system of claim 14, wherein the accumulation threshold is less than the consideration threshold.

16. The system of claim 13, wherein the data includes image data.

17. The system of claim 13, wherein the acceptance threshold is preset based on desired probability and/or type of data acquired.

18. The system of claim 13, wherein the consideration threshold is of a range less than the acceptance threshold.

19. The system of claim 13, wherein the run model is based on a type of data acquired.

20. The system of claim 13, where the data is modified via user input.

* * * * *